United States Patent
Cohen et al.

(10) Patent No.: US 8,682,935 B2
(45) Date of Patent: Mar. 25, 2014

(54) SYSTEM AND METHOD FOR APPLICATION NAVIGATION

(75) Inventors: Yoav Cohen, Rishon Le-Zion (IL); Yair Vidal, Herzelia (IL)

(73) Assignee: SAP Portals Israel Ltd., Raánana (IL)

( * ) Notice: Subject to any disclaimer, the term of this patent is extended or adjusted under 35 U.S.C. 154(b) by 308 days.

(21) Appl. No.: 12/569,934

(22) Filed: Sep. 30, 2009

(65) Prior Publication Data

US 2011/0078203 A1    Mar. 31, 2011

(51) Int. Cl.
   *G06F 7/00*     (2006.01)
   *G06F 17/30*    (2006.01)

(52) U.S. Cl.
   USPC .......................................................... 707/802

(58) Field of Classification Search
   None
   See application file for complete search history.

(56) References Cited

U.S. PATENT DOCUMENTS

| | | | |
|---|---|---|---|
| 5,734,886 A * | 3/1998 | Grosse et al. ........................... 1/1 |
| 2002/0026297 A1* | 2/2002 | Leymann et al. ................... 703/1 |
| 2002/0083067 A1* | 6/2002 | Tamayo et al. ............... 707/100 |

* cited by examiner

*Primary Examiner* — Usmaan Saeed
*Assistant Examiner* — Michele Choi
(74) *Attorney, Agent, or Firm* — Soroker-Agmon

(57) ABSTRACT

A system and method for providing enhanced accessibility to applications. The system and method capture communication between applications, in which a source application calls, activates, uses the functionality of, or otherwise utilizes a target application. The communication, including the application calls and the relevant context including for example parameters, is captured and the details are analyzed. It is then determined what context or parameters are required for activating the target application. The target application is offered to users of additional applications, in which a context relevant for activating the target applications is determined or created.

12 Claims, 2 Drawing Sheets

SYSTEM AND METHOD FOR APPLICATION NAVIGATION

TECHNICAL FIELD

The present disclosure relates to portals in general, and to a method and system for enabling navigating between applications within computerized systems and frameworks, in particular.

BACKGROUND

A portal is a web site or an application that provides an access point providing a user with a multiplicity of applications, services and information. Portals may present information from diverse sources in a unified way, and provide additional services, such as an internal search engine, e-mail, news, and various other features. Portals are often used by enterprises for providing their employees, customers, and possibly additional users with a consistent look and feel, and access control and procedures for multiple applications, which otherwise would have been separate entities altogether.

The accessibility of applications within a portal depends on the design of the portal and of the various applications. Thus, some applications may be accessed anytime directly from the portal, while others may be accessed only through other applications. For example, a supplier detail application may be enabled anytime, or only through another application that provides a supplier ID to the supplier detail application.

Thus, applications may exist which are accessible only through other applications. However, such applications can be highly beneficial but underutilized, since users may not be aware of their existence or may not know how to access or use them. Another problem in accessing such applications may be that a specific context may be required in order to access such application, for example a supplier ID in the example above, which is not easily available to a user so or to another application.

There is thus a need in the art for a method and system that will automatically enable further usage of computerized applications, not just from within predetermined applications which are so designed, but also from other applications, using other scenarios, and while supplying the context required by such applications.

SUMMARY

A system and method for providing enhanced accessibility to applications. The system and method capture communication between applications, in which a source application calls, activates, uses the functionality of, or otherwise utilizes a target application. The communication, including the application calls and the relevant context including for example parameters, is captured and the details are analyzed. It is then determined what context or parameters may be required for activating the target application. The target application can then be offered to users of additional applications, in which a context relevant for activating the target applications can be determined or created. The target application may also be made available to a user not from within other applications, but directly from the portal or from the operating system. The information can also be used in other ways.

A first aspect of the disclosure relates to a method for improving application usage within a computerized application environment, comprising: capturing application navigation data within a computerized application framework, in which an application is called; resolving a target application from the application navigation data; resolving communication parameters or context used for calling the target application; analyzing the communication parameters or contexts used for calling the target application to obtain a calling option for the target application; and providing a user, or a second application, with a possibility to call the target application, using the calling option. Within the method, the computerized application environment is optionally a portal in which the target application is executed. The method can further comprise a step of generating a data structure which represents applications and calling relationship between applications within the computerized application environment. Within the method, the data structure optionally comprises a first vertex and a second vertex, the first vertex representing a first application and the second vertex representing a second application, and a directed edge connecting the first vertex with the second vertex, the directed edge representing the first application calling the second application. The method can further comprise an application transport completeness analysis step for identifying applications belonging to a connected part of the data structure, the applications to be shipped together or deployed together. The method can further comprise a data conversion combining step for combining a first conversion from data available to a first application to data required by a second application, and a second conversion from data available to the second application to data required by a third application, so as to enable the first application to call the third application. The method can further comprise a step of analyzing calling patterns of applications or user workflows.

Another aspect of the disclosure relates to a system for improving application usage within a computerized application environment, comprising: a communication capturing component for capturing application navigation data within the computerized application framework, in which a target application is called; a target resolving component for resolving a target application from the application navigation data; a parameter or context resolver for resolving communication parameters or context used for calling the target application; a metadata analyzer for analyzing the communication parameters or contexts used for calling the target application to obtain a calling option for the target application; and an analysis result component for providing a user, or a second application, with an option to call the target application. Within the system, the computerized application environment is optionally a portal in which the target application is executed. The system can further comprise an application graph generation component for generating a data structure which represents applications and calling relationship between applications within the computerized application environment. Within the system the data structure optionally comprises a first vertex and a second vertex, the first vertex representing a first application and the second vertex representing a second application, and a directed edge connecting the first vertex with the second vertex, the directed edge representing the first application calling the second application. The system can further comprise an application transport completeness analysis component for identifying applications belonging to a connected part of the data structure, the applications to be shipped together or deployed together. Within the system, applications that are called from other applications are optionally shipped or deployed together. The system can further comprise a data conversion combining component for combining a first conversion from data available to a first application to data required by a second application, and a second conversion from data available to the second application to data required by a third application, so as to enable the first application to call the third application. The system can further comprise a workflow analysis component for of analyzing calling patterns of applications or user workflows.

Yet another aspect of the disclosure relates to a computer readable storage medium containing a set of instructions for a general purpose computer, the set of instructions comprising: capturing application navigation data within a computerized application framework, in which an at least one application is called; resolving a target application from the application navigation data; resolving communication parameters or context used for calling the target application; analyzing the communication parameters or contexts used for calling the target application to obtain a calling option for the target application; and providing a user, or a second application, with a possibility to call the target application, using the calling option.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
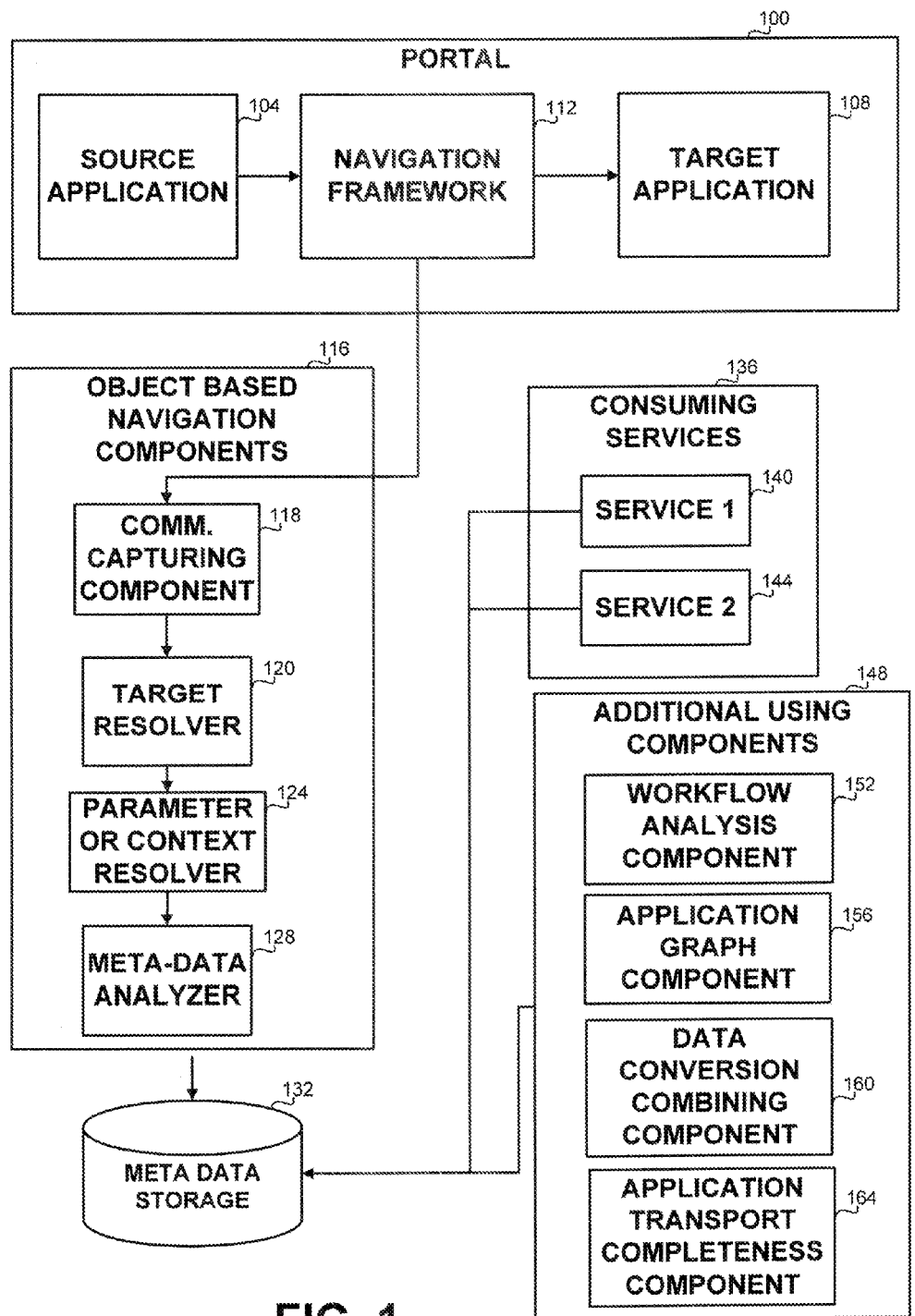
FIG. 1 is a block diagram of the main components in a portal using the system and method for application navigation, in accordance with the disclosure.

A system and method for enhanced application navigation within computerized environments such as portals.

The system and method provide enhanced accessibility to applications. The system and method capture communication between applications, in which a source application calls, activates, uses the functionality of, or otherwise utilizes a target application. The communication, including the application calls and the relevant context including for example parameters, is captured.

The communication details are analyzed, and it is determined what context or parameters may be required for activating the target application.

The target application can then be offered to users of additional applications, in which a context relevant for activating the target applications can be determined or created. The target application may also be made available to a user not from within other applications, but directly from the portal or from the operating system.

In some embodiments, the calling patterns between applications are stored and analyzed as well, and can be used for other purposes. One such purpose relates to application workflow analysis: realizing that an application A calls application B more than application C calls application B, and understanding the source of this pattern. Once the source of the pattern is determined, measures can be taken to improve the situation if required, such as determining user interface, storage, performance or other issues based on calling patterns. Another possible use for the patterns relates to application transport completeness, i.e. ensuring the completeness of an application suit, meaning that all applications that can be activated are indeed supplied. Yet another usage relates to application mashup, i.e., connecting applications by a user rather than by an application designer, by determining the option to call applications from within other applications using two or more context transformations. The transformations are thus used as a means for enabling mashups.

The method and system are optionally used in a computerized network environment, comprising one or more computing platforms. One or more of the computing platforms executes a portal, which is optionally accessed by one or more other computing platforms. A portal typically comprises one or more programs, applications, or services retrieving data from one or more sources and presenting the data in a content area of the portal, for example as part of a web page. Each program may be independent and activated by a user, or it may be activated by another program or service. Each program can supply one or more services which may require different parameters.

Each computing platform can be a server, a desktop computer, a laptop computer or any other computing platform provisioned with a Central Processing Unit (CPU) and memory and communication interface. Each program, application or service comprises one or more sets of interrelated computer instructions, implemented in any programming language and under any development environment.

Each user can access the portal from the computing platform that executes the portal, or from any other computing platform connected through a communication channel such as a Local Area Network (LAN), Wide Area Network (WAN), the Internet, intranet or the like, using any communication protocol.

Referring now to FIG. 1, showing a block diagram of a system for enhancing navigation within a computerized application environment.

The environment comprises portal 100 being a collection of applications or services. Portal 100 is executed on one or more computing platforms and accessed by one or more computing platforms.

Portal 100 comprises source application 104 which calls, accesses, uses or otherwise utilizes target application 108 optionally through navigation framework 112. Source application 104 and target application 108 can be any applications related to the portal. For example source application 104 can be an inventory management application, and target application 108 can be a supplier application 108, which is activated once a user of application 104 asks for details of a supplier of a particular item indicated in application 104.

Navigation framework 112 may also be implemented as a software component, which enables application 104 to activate functionality of application 108. Alternatively, application 104 activates functionality of application 108 directly.

The system comprises object based navigation components 116 which captures, analyzes, and uses or makes available the communication between application 104 and application 108, as well as all other such application-to-application navigations within the portal.

Object based navigation components 116 comprise communication capturing component 118 for capturing from navigation framework 112 the application navigation data within the computerized application framework, such as portal 100. If navigation framework 112 is not used and source application 104 calls target application 108 directly, then capturing is done from source application 104 or from the underlying operating system.

Object based navigation components 116 further comprises target resolver 120, which identifies target application 108 as activated by source application 104. Parameter or context resolver 124, also comprised by object based navigation components 116 identifies the parameters, values, variables, and other data passed from source application 104 to target application 108 while activating it, for supplying the relevant context data required for target application 108 to operate. Parameter or context resolver 124 can be implemented using sniffing techniques for resolving the communication between the calling application and the called application. Sniffing is a technique for monitoring and managing events in a communication bus by analyzing the packets transmitted on the bus. Sniffing can be used to modify the communication, for example for applications such as surveillance or data adjustment to particular runtime systems, or to monitor the communication, for example for analyzing traffic patterns on a bus. It will be appreciated that target resolver 120 and sniffer 124 can be implemented as a single unit or as multiple units.

It will also be appreciated that target application 108 may be operated in a multiplicity of ways, since it may supply multiple services, or one or more services or functions can be activated with a variety of parameters or contexts. For example, a supplier application can be activated with a supplier name, a supplier ID, or with no input at all, wherein the user is prompted to indicate a supplier. Further, the supplier application can be used for retrieving details of a particular supplier, or a list of all suppliers. Therefore, the mere activation of target application 108 can be identified separately from, or together with the accompanying data. It will also be appreciated that target resolver 120 and sniffer 124 also collect data related to applications being invoked automatically by other applications, and not only data related to applications which are invoked by a user using another application.

Object based navigation components 116 further comprise meta-data analyzer 128, for analyzing the data with which target application 108 has been activated in order to obtain a calling option for the target application. The data may include the parameters, values, variables, or contexts used for calling the target application. Since meta-data analyzer 128 is part of the environment, it is able to parse, interpret or otherwise extract the contents of the communication exchanged between source application 104 and target application 108, and particularly the activation parameters. The communication can be in a proprietary protocol available to meta-data analyzer 128, or in any publicly known protocol or format, such as TCP/IP, and Unified Resource Indicator (URI) which comprises an address and a data format.

Metadata analyzer 128 analyzes the scenarios in which target application 108 is called, identifies the services provided by target application 108, and for each service identifies the parameters or context with which it can be called. Metadata analyzer 128 thus extracts possible calling options for target application 108 and the relevant parameters or context. Metadata analyzer 128 can use any method, such as clustering, classification, categorization, or any other artificial intelligence technique in order to determine calling options from the captured communication.

Once the data is analyzed, it is stored in metadata storage 132, which comprises any of the following: source application 104, target application 108, the various services called within target application 108, the parameters or context with which target application 108 is called, and the values of these parameters.

Metadata storage 132 can be a database or any other software or other component, which communicates with a physical storage device, such as an optical storage device for example a CD, a DVD, or a laser disk; a magnetic storage device for example a tape or a hard disk; a semiconductor storage device for example a Flash device, a memory stick, or the like.

Once the data is stored, it can be used by multiple components. For example, any consuming service such as service 1 (140) or service 2 (144) can access storage 132 and retrieve a target application it can offer to its users, based on the data required by the target application. For example, if service 1 (140) is operative in a context in which a supplier ID is available, service 1 (140) can provide a user with access to a supplier detail application.

A consuming service can also be a portal or another framework, or a context-free application. In such situations, a user may be prompted to supply any of the parameters required for activating an applications, followed by activating the applications with the supplied details. Thus, the stored data enables white-n boxing hosted business applications, i.e., discovery of business parameters required for activating applications, and launching such applications with the correct parameters or context.

Additional applications 148 comprises other components for using the data, in addition to calling particular applications. For example, the additional applications can include a workflow analysis component 152. A user workflow analysis component can be used for analyzing from the meta-data generated by metadata analyzer 132, the frequency of different workflows in the system. For example, if application B is called 95% of the times from application A and 5% of the cases from application C, the reasons can be investigated. For example, it can be determined whether application B is conveniently accessible from application C, or if application B is really required for users of application C. The system can then be adapted to accommodate the conclusions, for example by enhancing the user interface, storage, user training, performance or other issues based on the discovered calling patterns.

The meta-data navigation information generated by meta-data analyzer 128 can thus be used by application graph component 156 to generate a data structure such as a graph or a map which represents the applications and their calling relationships. In such graph, an application is represented as a vertex, and a first application calling a second application is represented as a directed edge connecting the vertex representing the calling application with the vertex representing the called application. The graph thus indicates all relations between applications in the system, and indicates for each application the applications it calls and the applications that call it.

Another possible usage of the application navigation meta-data relates to creating Business mashups. A mashup generally refers to a framework such as a web page or an application that combines data or functionality from two or more sources to create a new service. Mashups may relate to easy and fast integration, frequently using open application programming interfaces (APIs) and data sources, to produce results other than the original destination of the raw source data.

The data structure created by application graph component 156 can be used to facilitate the creation of Business mashups by providing an automatic suggestion mechanism to the mashup user. The suggestion mechanism recommends to the user which applications can be connected. The suggestion mechanism can use the disclosed method and apparatus to query for available application connections in the system, even those not defined by the application developers. For example, when a new supplier table application is added to a mashup web page, the mashup framework queries the map to discover the supplier details application, which is connected to the suppliers table application, and makes the supplier table application available to all applications or users calling the supplier detail applications. The graph is thus used by data conversion combining component 160 used for combining two or more conversions, a first conversion converting data available to a first application into data required by a second application, and a second conversion converting data available to the second application into data required by a third application. The combined conversion thus enables the first application to call the third application without calling the second application.

Additional applications 148 can also include an application transport completeness component 164 for determining applications to be deployed and shipped together. When creating or deploying a version of a system such as a portal or a framework comprising multiple applications, when components are loosely connected then some components may be mistakenly left out and not shipped with the whole version. Analyzing application navigation scenarios may eliminate such cases, by indicating which applications are being called, and making sure that any such application is deployed as well. The data structure created by application graph component 156 can thus be used by application transport completeness component 164 for determining that applications belonging to one connected part of the data structure should be shipped or deployed together.

Figure 2:
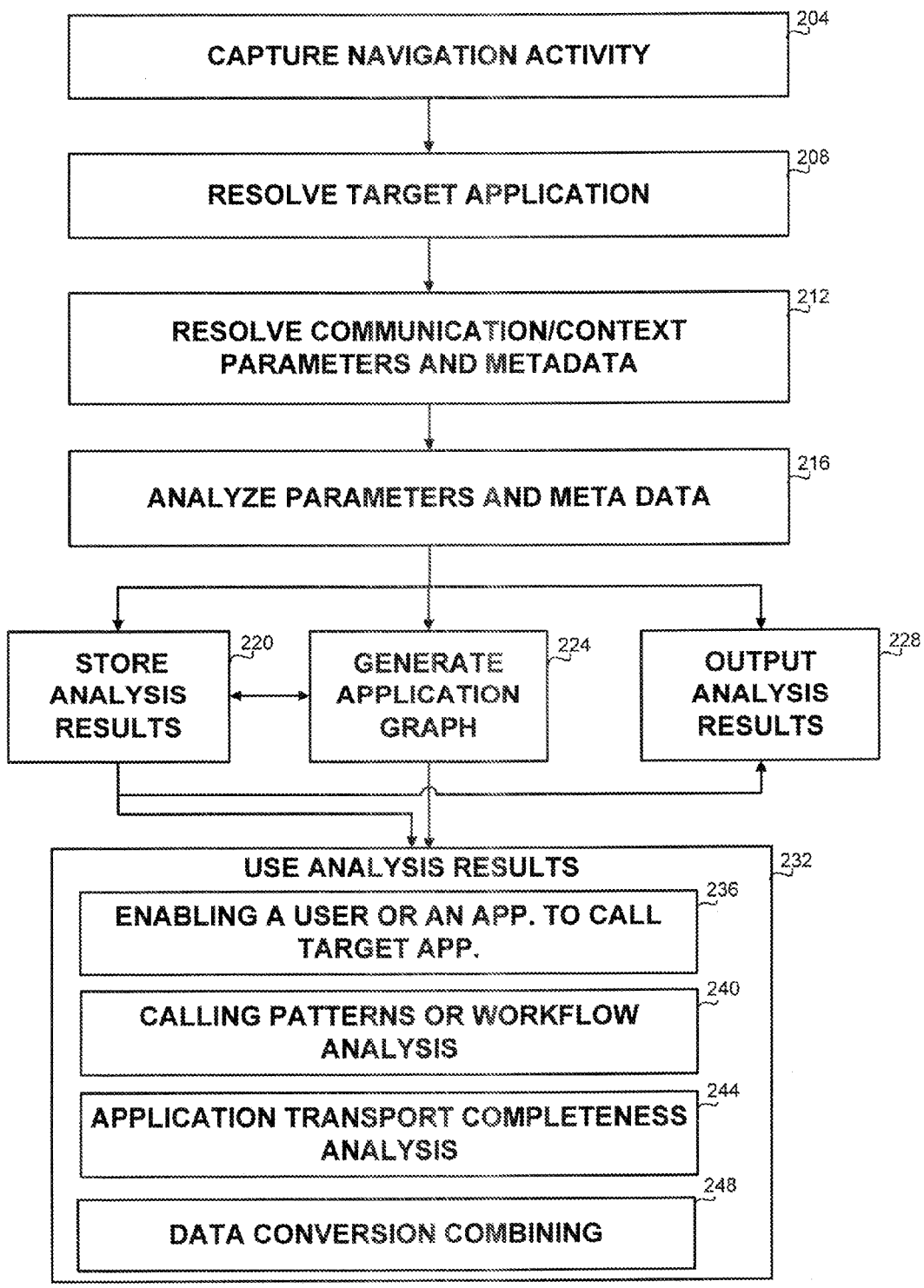
FIG. 2 is a flowchart of the main steps in a method for enhanced application navigation, in accordance with the disclosure.

Referring now to FIG. 2, showing a flowchart of the main steps in a method for enhanced application navigation. On step 204 application navigation activity is detected and its details are captured, which may include but are not limited to a calling application if any, a called application, parameters or context with which the application is called, relevant data, values of the parameters, or other data.

On step 208, the target application is resolved out of the captured data. On step 212 the communication parameters or metadata, or the relevant context is resolved from the captured communication details.

On step 216, the data with which one or more target applications have been activated is analyzed, to obtain one or more calling option for the target application. The data is captured in a known format, whether proprietary or publicly available, to enable parsing, interpretation or otherwise extraction of the parameters or context of the communication exchanged between the calling application and the called application, and particularly the activation parameters. The scenarios in which applications or users call other applications are analyzed and the services provided by the called applications are identified, as well as the parameters or context relevant for each service within each application. Analysis can use any method, including for example clustering, classification, or any other artificial intelligence technique.

Once the data is analyzed, on step 220 it is stored in metadata storage. The data optionally includes the calling applications, the called applications, the various services available within the called applications, the parameters with which the applications or services are called, the values of these parameters, or any relevant context details.

On optional step 224 an application graph is optionally generated from the analysis results, the graph indicating applications and calling relations between applications in the system.

On optional step 228 the analysis results are output in any required form, including textual, graphical, table, or others, and to any purpose. The analysis results can be output directly after analysis or retrieved after being stored.

On steps 232 the analysis results are used. The analysis results can be obtained from the storage or from any output channel. For some uses the application graph generated on step 224 can also be used. The information can be used in a variety of ways, including being used by human users, or by applications.

For example, on step 236 a user of the source application, or a second application can be provided with a possibility to call the target application, using a calling option realized through the analysis. Thus, any consuming service can access the stored information and retrieve which target application it can call or suggest to its users, based on the data required by the target application. For example, if a service is operative in a context in which a supplier ID is available, the service can provide a user with access to a supplier detail application. A consuming service can also be a portal or another framework, or a context-free application. In such situations, a user may be prompted to supply any of the parameters required for activating an applications, followed by activating the applications with the supplied details. Thus, the stored data enables white-boxing hosted business applications, i.e., discovery of business parameters required for activating applications, and launching such applications with the correct parameters.

Additional steps can include calling patterns of applications or user workflow analysis on step 240, for extracting from the meta-data generated on step 216, or from the graph created on step 224 application usage and calling data or statistics, such as the frequency of different workflows in the system. For example, if application B is called 95% of the times from application A and 5% of the cases from application C, the reasons can be investigated by a human or by an automatic process. For example, it can be determined whether application B is conveniently accessible from application C, or if application B is really required for users of application C. The system can then be adapted to accommodate the conclusions.

Another possible use of the application navigation metadata relates to application transport completeness analysis performed on optional step 244. When creating or deploying a version of a system such as a portal, when components are loosely connected then some components may be mistakenly left out and not shipped with the whole version. Analyzing application navigation scenarios may eliminate such cases, by indicating which applications are being called, and making sure that any such application is deployed as well. Transport completeness analysis step 244 optionally uses the application graph generated on step 224.

Yet another possible use of the application navigation metadata relates to business mashups. The application graph generated on step 224 can be used for mashups, i.e. connecting applications by a user rather than by an application designer, by determining the option to call applications from within other applications using two or more context transformations. Mashups can be performed by activating data conversion combining step 248.

The disclosed method and system enable easy and efficient discovery of new ways for using existing applications, based on analyzing calling patterns and calling parameters or contexts.

The method and system capture events in which one application is calling another application, or a user is activating an application. The method and system also capture the parameters or context with which the application is called.

The calling information is then analyzed for detecting the various options for calling the applications, and the results are stored.

The analysis results can then be used for multiple purposes, such as enabling a user or an application to call another application which may be relevant at that context, to discover applications that should be deployed together, to enable mashups, or to analyze and enhance calling options and patterns within an environment.

The system and method enable further and enhanced usage of existing applications which are only accessible through other applications, thus making such applications more beneficial and better utilized. The method and system study the current application usage patterns and options, and deduce further usages, which may make users more aware of the applications and easier ways to access or use them, optionally form different contexts.

It will be appreciated that the disclosed method and system can comprise a component and step for prompting a user to enter an item of a particular type, for example an integer, a date, a character string, or the like. Such component or step can be used for activating any application that requires a single or a few data fields, without having to require a particular context. Thus, the same component can be used for querying a user for an employee ID, a part number, a supplier number or the like, and then activating the relevant application, such as company directory, inventory application or supplier application, with the provided data.

It will be appreciated by a person skilled in the art that the disclosed system and method are exemplary only and that multiple other implementations can be designed without deviating from the disclosure. Any component or step can be split into a multiplicity of components or steps, while multiple components or steps can be combined into one. It will also be appreciated that further generally known or available components or steps may be required, such as utility components or steps for handling communication, storage, backup, user management, or the like.

It will be appreciated by persons skilled in the art that the present disclosure is not limited to what has been particularly shown and described hereinabove. Rather the scope of the present disclosure is defined only by the claims which follow.

What is claimed is:

1. A method for improving application usage of a user within a computerized application environment, comprising:
    capturing application navigation data using a computerized platform having a central processing unit, memory, and a communication interface for communicating over a communication bus within the computerized application environment in which a target application is called, wherein said capturing is performed by monitoring communication data collected from transmissions over the communication bus and identifying access to the called target application by other users or from applications not invoked directly by the user;
    resolving the target application from the application navigation data captured from the monitored communication data transmitted over the communication bus;
    resolving communication parameters for calling the target application from the monitored communication data transmitted over the communication bus;
    analyzing the communication parameters used for calling the target application to obtain a calling option for the target application;
    providing the user, or another application of the user, with a possibility to call the target application using the calling option; and
    generating a data structure which represents applications within the computerized application environment and calling relationships between the applications within the computerized application environment, wherein the data structure comprises a first vertex and a second vertex, the first vertex representing a first application and the second vertex representing a second application, and a directed edge connecting the first vertex with the second vertex, the directed edge representing the first application calling the second application.

2. The method of claim 1, wherein the computerized application environment is a portal in which the target application is executed.

3. The method of claim 1, further comprising an application transport completeness analysis step for identifying the applications belonging to a connected part of the data structure, wherein the applications will be shipped together or deployed together.

4. The method of claim 1, further comprising a data conversion combining step for combining a first conversion from data available to the first application to data required by the second application, and a second conversion from data available to the second application to data required by a third application, so as to enable the first application to call the third application.

5. The method of claim 1, further comprising a step of analyzing calling patterns of the applications within the computerized application environment or user workflows.

6. A system for improving application usage of a user within a computerized application environment, comprising:
    a computerized platform having a central processing unit, memory, and a communication interface for communicating over a communication bus;
    a communication capturing component on said computerized platform for capturing application navigation data within the computerized application environment in which a target application is called, wherein said capturing is performed by monitoring communication data collected from transmissions over the communication bus and identifying access to the called target application by other users or from applications not invoked directly by the user;
    a target resolving component for resolving the target application from the application navigation data captured from the monitored communication data transmitted over the communication bus;
    a parameter resolver for resolving communication parameters from the monitored communication data transmitted over the communication bus used for calling the target application;
    a metadata analyzer for analyzing the communication parameters used for calling the target application to obtain a calling option for the target application;
    an analysis result component for providing the user, or another application of the user, with an option to call the target application using the calling option; and
    an application graph generation component for generating a data structure which represents applications within the computerized application environment and calling relationships between the applications within the computerized application environment, wherein the data structure comprises a first vertex and a second vertex, the first vertex representing a first application and the second vertex representing a second application, and a directed edge connecting the first vertex with the second vertex, the directed edge representing the first application calling the second application.

7. The system of claim 6, wherein the computerized application environment is a portal in which the target application is executed.

8. The system of claim 6, further comprising an application transport completeness analysis component for identifying the applications belonging to a connected part of the data structure, wherein the applications will be shipped together or deployed together.

9. The system of claim 6, wherein applications that are called from other applications are shipped or deployed together.

10. The system of claim 6, further comprising a data conversion combining component for combining a first conversion from data available to the first application to data required by the second application, and a second conversion from data available to the second application to data required by a third application, so as to enable the first application to call the third application.

11. The system of claim 6, further comprising a workflow analysis component for analyzing calling patterns of the applications within the computerized application environment or user workflows.

12. A non-transitory computer readable storage medium containing a set of instructions for a general purpose computer, the set of instructions comprising:

a method for improving application usage of a user within a computerized application environment by capturing application navigation data using a computerized platform having a central processing unit, memory, and a communication interface for communicating over a communication bus within a computerized application environment in which a target application is called, wherein said capturing is performed by monitoring communication data collected from transmissions over the communication bus and identifying access to the called target application by other users or from applications not invoked directly by the user;

resolving the target application from the application navigation data captured from the monitored communication data transmitted over the communication bus;

resolving communication parameters for calling the target application from the monitored communication data transmitted over the communication bus;

analyzing the communication parameters for calling the target application to obtain a calling option for the target application;

providing a user, or another application, with a possibility to call the target application using the calling option; and generating a data structure which represents applications within the computerized application environment and calling relationships between the applications within the computerized application environment, wherein the data structure comprises a first vertex and a second vertex, the first vertex representing a first application and the second vertex representing a second application, and a directed edge connecting the first vertex with the second vertex, the directed edge representing the first application calling the second application.

* * * * *